United States Patent [19]
Larsen

[11] 3,918,622
[45] Nov. 11, 1975

[54] METAL BELLOWS WELDER
[75] Inventor: Richard R. Larsen, Daytona Beach, Fla.
[73] Assignee: Bailey Meter Company, Wickliffe, Ohio
[22] Filed: Mar. 25, 1974
[21] Appl. No.: 454,323

[52] U.S. Cl................ 228/8; 29/454; 219/125 PL; 318/577
[51] Int. Cl.².......................................... B23K 1/00
[58] Field of Search.................... 228/8–12, 56.5; 29/454; 219/124, 125 R, 125 PL; 318/577

[56] References Cited
UNITED STATES PATENTS

| | | | |
|---|---|---|---|
| 2,971,079 | 2/1961 | Sommeria | 219/125 R |
| 3,609,288 | 9/1971 | Sciaky | 219/124 |
| 3,627,972 | 12/1971 | Iceland | 219/124 |
| 3,666,161 | 5/1972 | Keller | 228/12 |
| 3,766,355 | 10/1973 | Kottkamp | 219/125 PL |
| 3,819,902 | 6/1974 | Sidbeck | 228/9 |

FOREIGN PATENTS OR APPLICATIONS
450,868   8/1948   Canada............................ 29/454

*Primary Examiner*—Al Lawrence Smith
*Assistant Examiner*—Robert C. Watson
*Attorney, Agent, or Firm*—John F. Luhrs

[57] ABSTRACT

Apparatus for welding together the circumferential edges of a preselected pair of adjacent metal diaphrams in a stack of diaphrams assembled on a rotatable arbor wherein a beam of light reflected from the weld causes the welding torch to track the circumferential seam or joint between the edges of the diaphrams as the arbor rotates and wherein, upon completion of the circumferential weld, the welding torch is moved to another preselected pair of diaphrams in the stack and the operation repeated.

9 Claims, 2 Drawing Figures

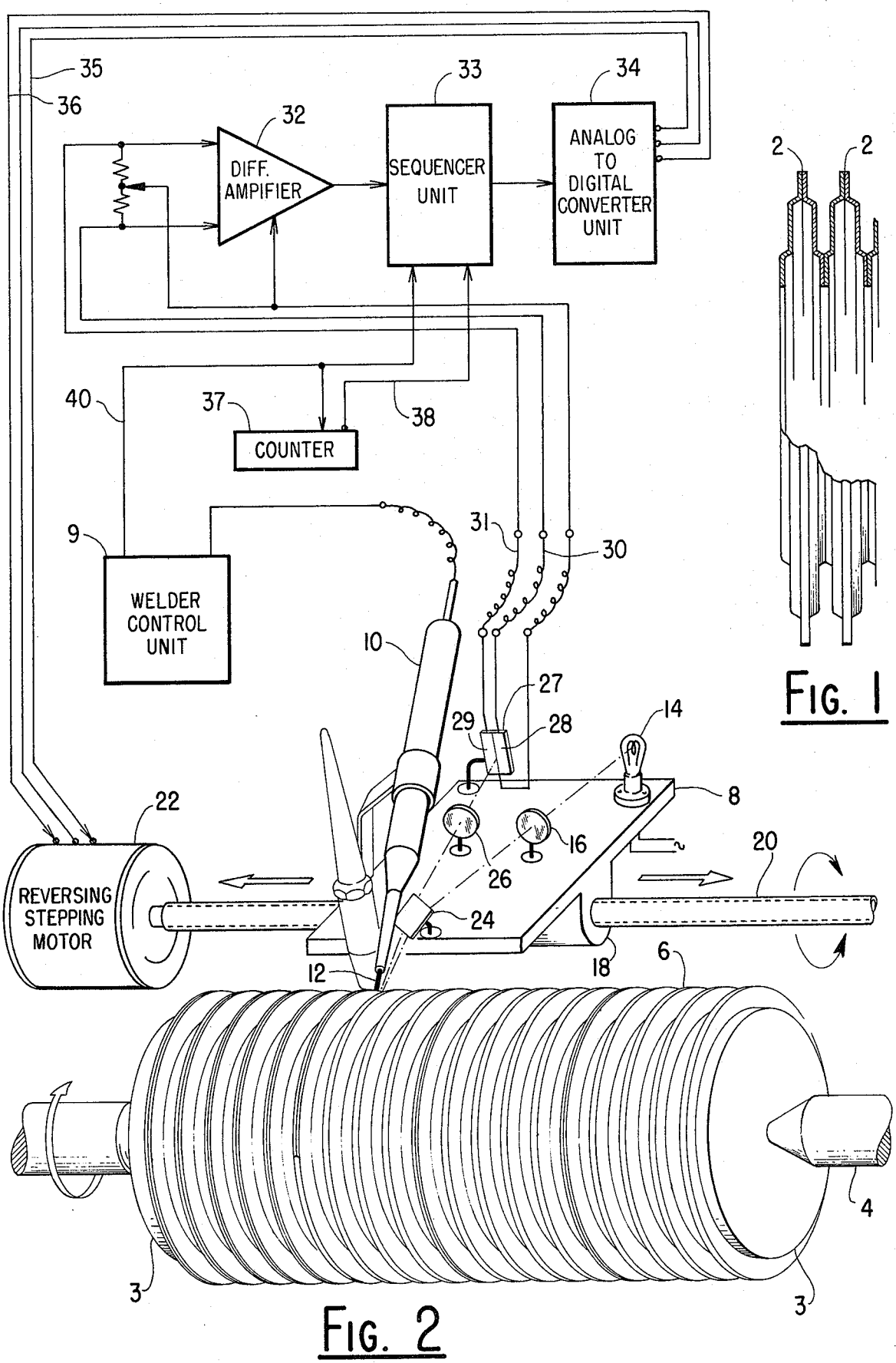

METAL BELLOWS WELDER

This invention relates to a machine for the automatic, high precision welding together of the circumferential edges of a pair of metal diaphragms in the formation of a welded metal bellows. Several problems arise in attempting to weld together such circumferential edges. Precise lateral alignment of the welding torch with the weld joint must be maintained. As an order of magnitude, the joing of two 0.10 inch thick diaphragms requires positioning of the torch within approximately ± 0.003 inches of correct lateral alignment with the seam or joint to maintain acceptable weld geometry. The precise positioning of the torch, upon completion of the weld between two diaphrams, to the next selected pair of diaphrams presents another problem as the exact distance therebetween cannot be predetermined. It is to the solution of these problems, as well as others encountered in the automatic forming of welded metal bellows, that my invention is addressed.

In accordance with my invention a non-contact optical tracking of the weld immediately following the formation thereof maintains precise torch alignment with the weld joint or seam.

Further, in accordance with my invention, upon completion of a weld, the torch is automatically advanced to the next succeeding pair of diaphrams and the welding operation repeated.

Further, in accordance with my invention, upon completion of a predetermined number of welds, forming a bellows having a desired number of diaphrams, the torch is programmed to skip the seam between the next succeeding pair of diaphrams in the stack, thus permitting several bellows to be formed in a single pass of the torch.

These and further objectives of my invention will be apparent as the description proceeds in connection with the drawings.

IN THE DRAWINGS

FIG. 1 is a fragmentary view in cross section of two pair of typical metal diaphragms showing in exaggerated form the internal and external welds by which a plurality of pairs may be joined together to form a bellows.

FIG. 2 is schematic illustration of one form of an automatic bellows welder embodying the principles of my invention.

DETAILED DESCRIPTION

As well known in the art, welded metal belllows are formed by welding together a plurality of diaphrams each of which is formed from a specified metal of particular thickness, configuration and size depending upon the end application of the bellows. In FIG. 1 there is shown a typical bellows section formed from diaphrams having a contour known in the art as, "Flat Cantilever Type" which affords a constant effective area and hence is best suited for applications requiring a force output which is linear with applied pressure. Other common types each having a specific field of application are "Rippled Nesting," "Partial Nesting" and "Rippled Cantilever." Regardless of the diaphram contour the specific problem in the manufacture of a bellows from the diaphram elements to which my invention is directed is the automatic, rapid and precise welding together of the outer or external seams or joints formed between adjacent diaphrams as shown at 2 in FIG. 1.

Referring now to FIG. 2, the diaphrams 6 to be welded are stacked between suitable end pieces 3 on an arbor 4 adapted to rotate in the direction indicated by the arrow at a preselected speed throughout the welding operation by any suitable motor means (not shown). Mounted on a carriage 8 is a welding torch 10 receiving power from a welder control unit 9. The welder may be of the tungsten inert gas (T.I.G.) type provided with a nonconsumable electrode 12 suitable for welding together metals such as stainless steels, nickel base alloys, high permeability steels, titanium alloys and the like. Electrode 12, during the welding operation, must be laterally aligned with the seam or joint between the two diaphrams to be sealed. As it is not uncommon for there to be a lateral runout of the weld joints it is apparent that continuous tracking of the electrode with the weld joint is necessary if proper alignment is to be maintained throughout the welding operation.

The carriage 8 is mounted on a ball nut unit 18 cooperating with a ball screw 20 adapted to be rotated clockwise or counter clock wise by a stepping motor 22 hence providing for lateral movement of the torch 10 as required to maintain proper alignment of the electrode 12 with the weld joint.

As previously described my new invention comprehends the automatic positioning of the torch 10 to maintain alignement with the weld joint through noncontact means. To this end there is mounted on the carriage 8 a radiation source, such as a lamp 14, the radiation from which by way of a suitable optical and focusing system schematically identified as a lens 16, is reflected by a mirror 24 on to the weld bead formed by and immediately following the electrode 12. Radiation reflected from the weld bead is then reflected by the mirror 24, by way of a suitable optical and focusing system, schematically identified as a lens 26, onto a duel element phototransducer 27 having sides 28 and 29 separated by a narrow gap. So long as proper alignment between the electrode 12 and the weld joint is maintained, radiation reflected from the weld joint will fall equally on both sides 28 and 29 of the phototransducer 27. However, upon misalignment, a greater amount of radiation will fall on one side or the other, depending upon the direction or sense of the misalignment, which by means to be described in greater detail hereinafter, effects operation of the stepping motor 22 to restore alignment. Radiation reflected from a convex cylindrical surface such as the weld bead, peaks as a line image which through the optical system 26 is projected onto the phototransducer 27 and hence a significant difference in signal output from the two sides of the phototransducer will result upon displacement of the line image from the narrow gap separating the two sides 28 and 29. Furthermore, the magnitude of the signal output from each side of the phototransducer 27 is proportional to the radiation to which it is exposed, thus the difference in the signal outputs is proportional to the lateral displacement of the electrode 12 from the weld joint.

The signals generated by phototransducer 27 are transmitted through lines 30, 31 to a differential amplifier 32 which algebraically adds the signals and generates an output signal of polarity depending upon the sense of the displacement of the electrode 12 from the weld joint and in magnitude proportional to the amount of the displacement. The output signal from amplifier 32 is transmitted through a sequencer unit 33, later to be described in detail, and thence to an analog to digital converter unit 34, generating pulses having a frequency proportional to the magnitude of the output signal from amplifier 32 and of one polarity, transmitted through line 35 to drive motor 22 in one direction, or of opposite polarity transmitted through line 36 to drive motor 22 in the opposite direction. It is apparent that as the pulses have a frequency proportional to the magnitude of the displacement of the electrode 12 from the weld joint, or null position as it may be called, the average speed of the motor 22 will vary accordingly and hence the electrode 12 will approach the null position with nearly asymtotic motion.

Upon completion of the weld, by means of an internal timer or the like, the welder control unit 9 cuts the power supply to electrode 12 for a predetermined increment of time or sufficient duration to complete the traversing operation from one pair of bellows to the next. At the start of this increment of time the welder control unit 9 also sends a pulse signal along line 40 to the weld sequencer unit 33 which is effective to momentarily render ineffective the output signal from amplifier 32 and transmit a steady signal to the analog to digital converter unit 34 having a polarity required to drive the carriage 8 toward the next succeeding pair of diaphrams. After a short time delay the sequencer unit 33 renders effective the output signal from the differential amplifier 32 as the signal input to the analog to digital converter unit 34. At this point in time positioning of the carriage 8 is accordingly restored to the optical system heretofore described. After completion of the traversing operation, power is restored to the electrode 12 by the welder control unit 9 and the normal welding operation is repeated.

Through suitable electric circuitry and components, as shown schematically in FIG. 2, my invention further comprehends skipping a pair of mating diaphragms after a prescribed number of pairs have been welded together to thereby form a plurality of bellows of desired length in a single loading of the arbor 4 and pass of the electrode 12. An adjustable counter 37 receives the pulse signals from welder control unit 9, by way of line 40, each pulse representing the completion of a weld. At a predetermined number of pulses, the counter 37 transmits a signal along line 38 to the sequencer unit 33 prolonging the period of time in which the signal from differential amplifier 32 is rendered inoperative and the steady signal is transmitted to the analog to digital converter unit 34 so that the electrode 12 skips the next succeeding pair of diaphrams and the transverse is made to the next pair of diaphrams as heretofor described. Simultaneously with the signal transmitted along line 38 by counter 37, the counter resets itself so as to receive the desired number of pulse signals from welder control unit 9 before again transmitting a signal line 38 to the sequencer unit 33.

I claim:

1. In the formation of welded metal bellows, a machine for automatically welding together the outer circumferential edges of a pair of diaphrams having a rotatable arbor on which said diaphrams are mounted and rotate, a carriage, a welding torch mounted on said carriage and a reversing motor operatively connected to said carriage for positioning said carriage parallel to said arbor in forward and reverse directions, the combination comprising, a radiation source mounted on said carriage, a first optical system mounted on said carriage directing radiation from said source onto the weld bead after having been generated by the welding torch, a phototransducer generating an output signal corresponding to the radiation to which it is exposed mounted on said carriage, a second optical system mounted on said carriage exposing said phototransducer to the radiation from said source which is reflected by said weld bead and means under the control of said output signal operating said reversing motor whereby said carriage is positioned to maintain said torch in lateral alignment with said weld bead as the arbor rotates.

2. The combination as set forth in claim 1 wherein said phototransducer generates an analog signal having a magnitude corresponding to the magnitude of the lateral displacement of the welding torch from said weld bead and having a sense dependent upon the direction of the lateral displacement of the torch from the weld bead.

3. The combination as set forth in claim 2 wherein said means for positioning said carriage includes a reversible stepping motor and the means operating said stepping motor includes an analog to digital converter responsive to said analog signal and generating otput pulses having a frequency and sense corresponding to the magnitude and polarity of said analog signal whereby said output pulses operate said reversing motor as required to maintain lateral alignment of said torch with said weld bead.

4. The combination according to claim 1 wherein said welding torch, said first optical system and said radiation source are disposed in a first plane normal to the longitudinal axis of the arbor on which said diaphrams are mounted.

5. The combination according to claim 1 whereein said second optical system and said phototransducer are disposed in a second plane forming an acute angle with said first plane.

6. The combination according to claim 1 wherein said phototransducer is a dual element phototransducer.

7. The combination as set forth in claim 2 wherein a stack of pairs of diaphrams are mounted on the arbor and further including means establishing a control signal of predetermined sense and magnitude upon completion of the welding together of the outer circumferential edges of a first pair of diaphrams operating said reversing motor to position said carriage and torch to the next succeeding pair of diaphrams in said stack.

8. The combination as set forth in claim 7 further including means for establishing said control signal for a predetermined increment of time.

9. The combination as set forth in claim 7 further including means causing said control signal upon completion of the welding together of the outer circumferential edges of a predetermined number of pairs of diaphrams in said stack to operate said reversing motor to position said carriage whereby said torch skips the next succeeding pair of diaphrams and a plurality of bellows are formed from said stack of diaphram pairs during a single pass of said torch over said stack.

* * * * *